United States Patent [19]

Reinartz et al.

[11] Patent Number: 4,950,027
[45] Date of Patent: Aug. 21, 1990

[54] BRAKE PRESSURE REGULATOR

[75] Inventors: Hans-Dieter Reinartz, Frankfurt Am Main; Helmut Steffes, Hattersheim, both of Fed. Rep. of Germany

[73] Assignee: Alfred Teves GmbH, Frankfurt Am Main, Fed. Rep. of Germany

[21] Appl. No.: 264,128

[22] Filed: Oct. 28, 1988

[30] Foreign Application Priority Data

Nov. 6, 1987 [DE] Fed. Rep. of Germany ....... 3737727

[51] Int. Cl.$^5$ .............................................. B60Z 8/02
[52] U.S. Cl. .................................... 303/114; 303/119
[58] Field of Search ............... 303/113, 114, 115, 116, 303/119; 60/591, 574, 553, 595

[56] References Cited

U.S. PATENT DOCUMENTS

| | | | |
|---|---|---|---|
| 4,526,003 | 7/1985 | Leiber | 303/114 X |
| 4,634,190 | 1/1987 | Wupper | 303/119 |
| 4,678,243 | 7/1987 | Leiber | 303/114 |
| 4,703,978 | 11/1987 | Belart et al. | 303/114 |
| 4,753,069 | 6/1988 | Seibert et al. | 303/114 |
| 4,759,591 | 7/1988 | Reinartz et al. | 303/114 |

FOREIGN PATENT DOCUMENTS

| | | |
|---|---|---|
| 3612793 | 10/1982 | Fed. Rep. of Germany . |
| 3627902 | 2/1988 | Fed. Rep. of Germany . |
| 2080510 | 5/1982 | United Kingdom ................ 303/114 |
| 2120333 | 11/1983 | United Kingdom . |
| 2169370 | 7/1986 | United Kingdom . |
| 2174161 | 10/1986 | United Kingdom . |

Primary Examiner—Andres Kashnikow
Assistant Examiner—Matthew C. Graham
Attorney, Agent, or Firm—Robert P. Seitter

[57] ABSTRACT

In a brake pressure regulator for a hydraulic brake system of automotive vehicles having an anti-locking control and/or a traction skid control and including a master cylinder and a hydraulic brake force booster, the actuating piston of the brake force booster along with a guiding member forms a modulator chamber. The pressure in the modulator chamber is varied by electromagnetically switchable blocking and passage valves thereby moving the actuating piston such that the force of the brake force booster is reduced and increased, respectively, thereby changing the pressures in the working chambers of the master cylinder. In this manner, in the control mode, the pressure in the wheel cylinders can be changed in accordance with a control algorithm to enable the brake pressure regulator to be operated in multiplex operation.

4 Claims, 2 Drawing Sheets

BRAKE PRESSURE REGULATOR

BACKGROUND OF THE INVENTION

The present invention is concerned with a brake pressure regulator for a hydraulic brake system for use with automotive vehicles provided with an anti-locking device and/or a traction skid control.

Brake pressure regulators for preventing automotive wheels from locking during deceleration are being increasingly employed in automotive vehicles. Such brake systems, in a large number of cases, are equipped with a brake force booster. In employing brake force boosters, the booster either can play a passive part in the regulating mode or the brake force booster itself can be incorporated into the regulating mode. Stated differently: the brake force booster, in conventional anti-locking devices, either can perform its brake force boosting function only in the normal brake mode or it can actively participate in the pressure modulation.

In one type of brake pressure regulator including brake force boosters, the brake force boosters are actively incorporated into the brake pressure regulation. Such brake force boosters of the hydraulic type, which cooperate with a pressure modulator for pressure modulation in accordance with one or more control algorithms stored in an electronic regulator, are well known in the art.

For example, German Offenlegungsschrift No. 3612793 discloses a hydraulic brake system for automotive vehicles provided with an anti-locking control exhibiting the following characteristics. Being an anti-locking regulator, such a brake system includes a master brake cylinder operated with a first pressure fluid, and a brake force booster mechanically acting on the master brake cylinder and operated with a second pressure fluid, with the brake force booster being operable as a pressure modulator for the anti-locking control and check valves being respectively provided in the brake conduits leading from the master brake cylinder to the wheel cylinders.

In such brake systems, the brake force booster is a known hydraulic brake force booster including a pressure conduit connection capable of being connected to a hydraulic pressure source, and at least one return conduit connection capable of being connected to the reservoir which also includes an auxiliary connection in communication with the working chamber thereof. The pressure modulation during the anti-locking control, on the one hand, is generated by the working piston of the brake force booster and, on the other hand, is generated by a special modulation member independent thereof.

To explain the problem basic to the present invention, reference will be made in closer detail to the construction and operation of the subject matter of FIG. 2 of German Offenlegungsschrift No. 3612793.

In the normal brake mode, pressure fluid from the pressure source is supplied to the booster to move the working piston of the booster. The working piston, in turn, moves a push rod which, in turn, moves the working piston of the master cylinder.

The anti-locking control mode in the central control area, i.e., under uniform road conditions, operates as follows: the control solely relies on the auxiliary piston also called a modulation member. Once a pressure reduction during the control mode is required, hydraulic pressure is applied to the modulation member (from the left in FIG. 2). It is, therefore, moved to the right, returning the working piston of the booster to the right. The working chambers of the master cylinder are thereby pressure-relieved. Once pressure stability is required during the control mode, the pressure modulation member is hydraulically blocked, i.e., the pressure chambers to the left and to the right of the modulator member will be locked.

Once a pressure re-increase in the control mode is required, pressurized fluid will be discharged from the chamber to the left of the modulator member and the modulator member will move to the left. The booster piston also moves to the left. Also, the working piston of the master cylinder moves to the left, thereby attaining a pressure build-up in the wheel cylinders. In the central control area, the control is thus solely achieved by the modulator member and the electromagnetic valves, respectively, that are associated with the modulator member.

The pressure to the left of the modulator member is regulated by a passage valve and by a blocking valve. The pressure in the chamber to the right of the modulator member is regulated by a blocking valve and by a passage valve.

In the event of an abrupt change in the friction coefficient or in a skid, substantial pressure variations in the wheel cylinders will become necessary. In that situation, the working piston of the booster will become operative. The working piston will also become operative once the brake system operates in the traction skid control mode.

The anti-locking control mode, incorporating the working piston of the booster, is carried out as follows: the working piston (in FIG. 2 of said Offenlegungsschrift, on the left hand side thereof) is exposed to an application of pressure controlled by a blocking valve and a passage valve. The pressure to the right of the working piston of the booster is controlled by a blocking valve and a passage valve. As conveyed in the subject matter of Offenlegungsschrift No. 3612793, large volumes of fluid will have to be moved very frequently. for moving the volumes of fluid, only very short time intervals are available. The modulator piston according to the aforementioned Offenlegungsschrift requires a substantially larger effective cross-section or driving face than the transmission piston, thereby permanently circulating substantial volumes of fluid.

For the foregoing reasons, brake systems of the type of described in Offenlegungsschrift no. 3612793 and systems of a similar construction are less suitable for use in multiplex operation. In practice, it has been found, in addition, to be disadvantageous with state-of-the-art brake pressure regulators that, in view of the large volumes of fluid to be circulated, high dynamic pressures develop in the modulator compartment. Not only do such high pressures hamper the multiplex operation of the brake system, but they also effect any normal decelerating operation. In the state-of-the-art systems, large valve cross-sections are, therefore, required. The volume consumption of the state of art regulators is correspondingly high.

Thus, it would be desirable that the aforedescribed disadvantages involved with the state of art brake pressure regulators be avoided. It is intended to provide a brake pressure regulator which is suitable for multiplex operation. Moreover, it is an object of the invention to provide a brake pressure regulator having low mechanical design costs and which is capable of being employed for anti-locking control and traction skid control. Further, the construction of the brake pressure regulator is largely to be based on existing components. In the anti-locking control mode and in the traction skid control mode, comparatively low volumes of fluids are to be circulated. Finally, consumption of pressure fluid during the control mode is also to be reduced.

SUMMARY OF THE INVENTION

The present invention is a brake pressure regulator for a hydraulic brake system comprising a master cylinder, preferably a tandem master cylinder, a hydraulic brake force booster, including a supply aggregate and a pressure fluid reservoir, with the hydraulic brake force booster comprising an actuating element, preferably an actuating piston, and a guiding member for the actuating element. The regulator further comprises wheel cylinders, an electronic regulator generating output signals on the basis of wheel sensor signals supplied to the input thereof in accordance with one or more control algorithms, with the output signals switching electromagnetically actuatable hydraulic valves. The problems of prior art regulators are solved in the present invention in that the actuating element and the guiding member for the actuating element form a modulator for the change in the hydraulic pressure in the working chamber of the master cylinder.

According to another embodiment of the invention, the guiding member and the actuating piston comprise a modulator compartment to which variable hydraulic pressure and/or pedal force can be applied. The modulator compartment, through hydraulic conduits, can be connected to the pressure fluid source or the non-pressurized reservoir. Moreover, provision may be made that the actuating piston, through the hydraulic pressure prevailing in the modulator compartment, is located and configured in a movable fashion. The guiding member, in the interior thereof, may comprise the modulator compartment and may serve as a cylindrically shaped guide for the piston-type-configured brake pedal-sided end of the actuating element. Alternately, the guiding member may be configured as the closure member for the brake-pedal-sided opening of the common housing for master cylinder and booster.

In another embodiment of the present invention, in a brake pressure regulator comprising a hydraulic brake force booster including a pressure fluid inlet valve and a pressure fluid outlet valve, the actuating piston is configured in a manner that pressure fluid can be applied thereto in the modulator that pressure fluid can be applied thereto in the modulator compartment so as to open the pressure fluid outlet valve and permit a closure of the pressure fluid inlet valve, thereby reducing or neutralizing the booster effect.

According to a preferred form of embodiment of the invention, an electromagnetically switchable passage valve, insuring the pressure fluid supply of the modulator compartment, is provided in the hydraulic supply conduit and located between the pressure fluid supply aggregate and the modulator compartment. At the same time, an electromagnetically switchable blocking valve is disposed in the hydraulic outlet conduit and located between the modulator compartment and the non-pressurized reservoir. With the aid of the passage valve and the blocking valve, the pressure is changed in the modulator compartment.

When the brake pressure regulator according to the present invention is operated in the traction skid control mode, according to another form of embodiment of the invention, an electromagnetically switchable blocking valve is provided in the discharge conduit of the booster pressure chamber, with the blocking valve, in the traction skid control mode, separating the booster pressure chamber from the non-pressurized reservoir. In this embodiment, a hydraulic pressure conduit (traction skid control conduit) connects the pressure fluid supply aggregate to the booster pressure compartment, and an electromagnetically switchable passage valve is provided in the traction skid control conduit, which passage valve is capable of applying pressure fluid to the booster pressure compartment. It has proven feasible to provide, in the traction skid control conduit, preferably between the passage valve and the booster pressure chamber, a pressure limiting valve for adjusting, and especially decreasing, the pressure level during the traction skid control mode.

The aforedescribed disadvantages involved with the prior state of art are overcome by the present invention. In addition, the following advantages are attained: the entire anti-locking system is lower-priced and improved in terms of its function. The modulator of the invention, as compared with the prior art systems, exhibits only a relatively low volume take-up, and it is possible to utilize the modulator with existing valves.

Further details will be set out in the following description of two forms or embodiments of the invention.

BRIEF DESCRIPTION OF THE DRAWINGS

The forms or embodiments of the present invention will be described with reference to the following figures wherein.

DESCRIPTION OF THE PREFERRED EMBODIMENTS

Figure 1:
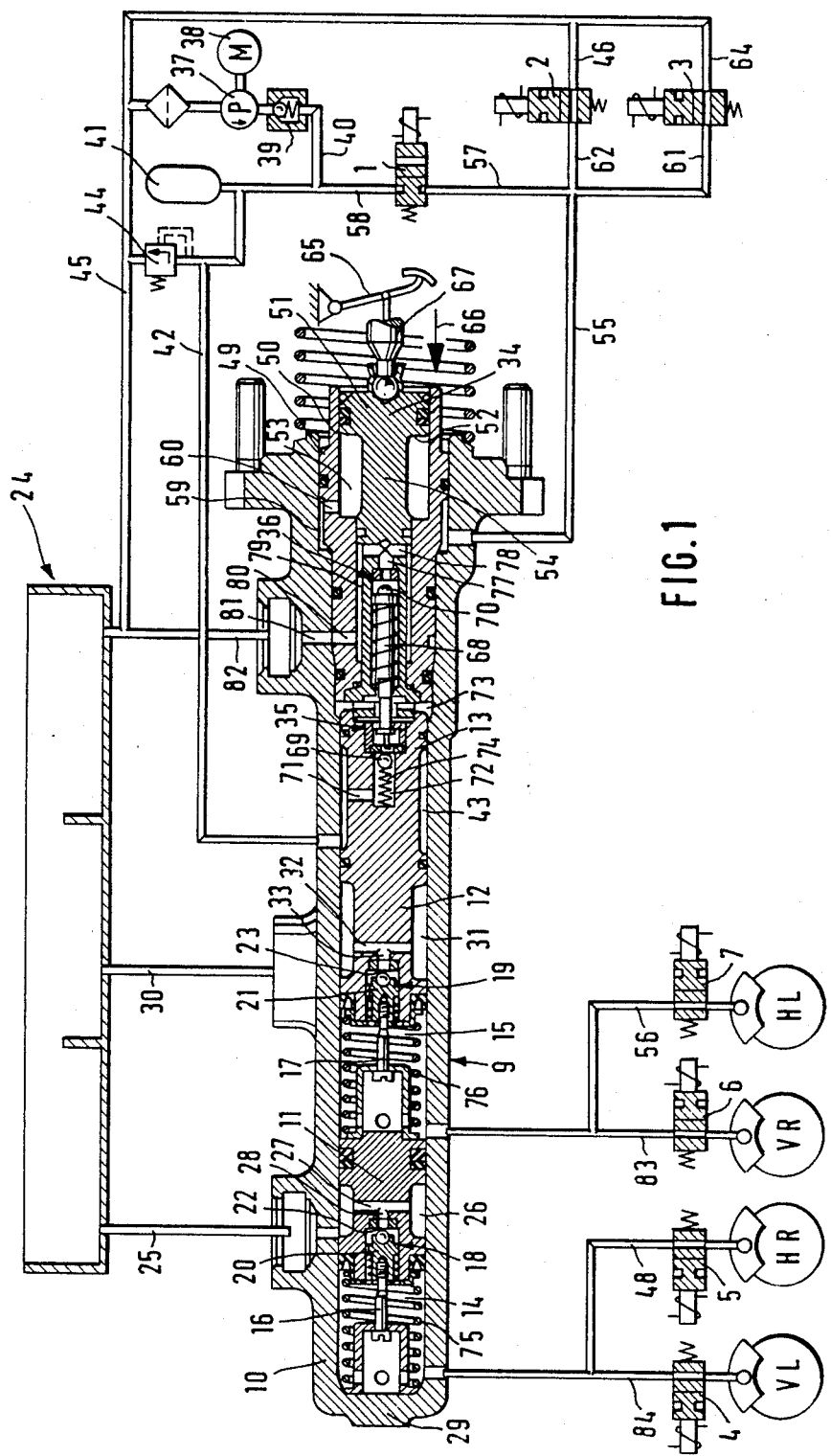
FIG. 1 is a sectional view of one embodiment of the brake pressure regulator provided with an anti-locking control.
Figure 2:
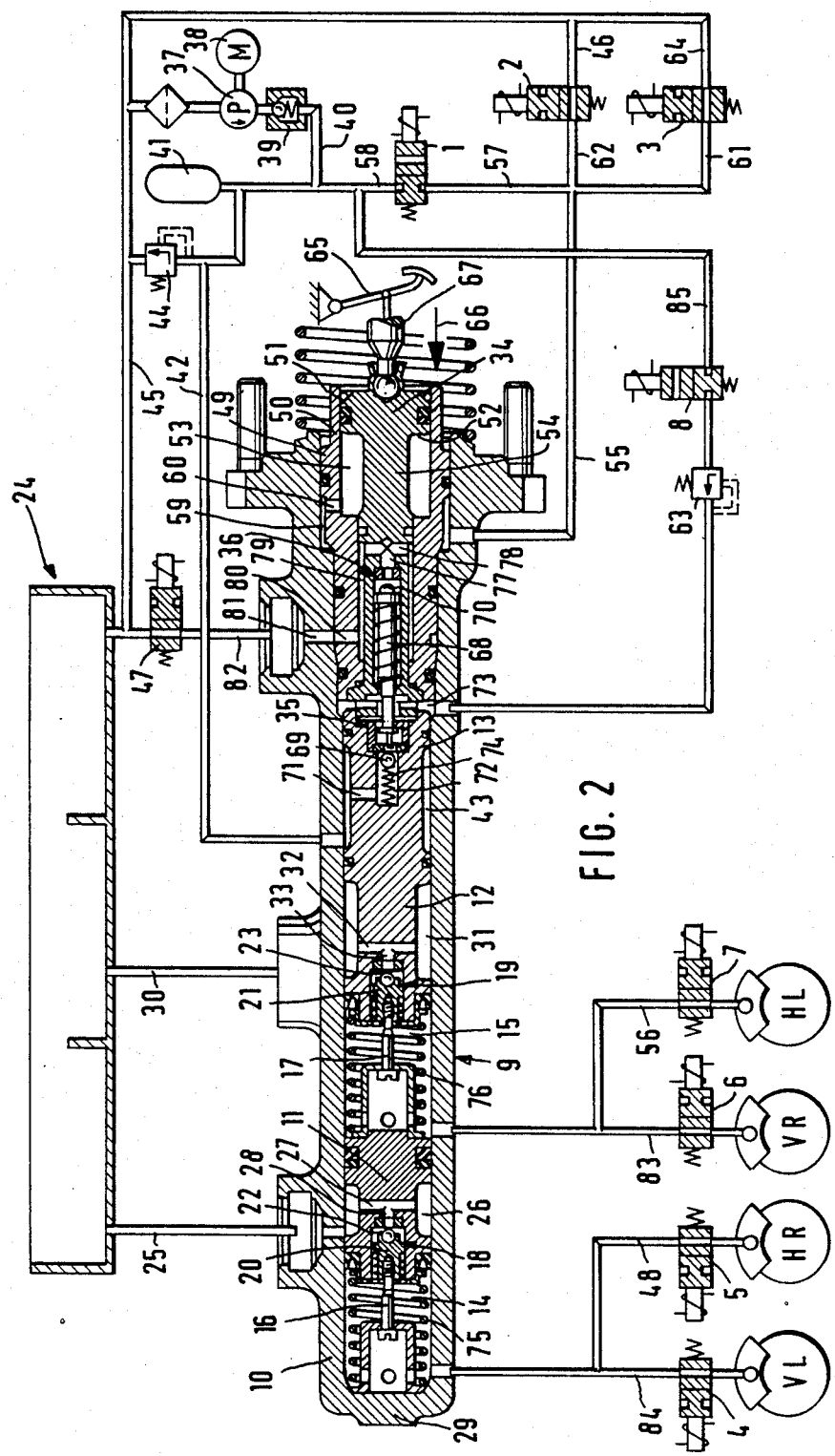
FIG. 2 is a sectional view of another embodiment of the brake pressure regulator provided with an anti-locking control and a traction skid control.

FIGS. 1 and 2 illustrate a tandem master cylinder 9, a booster, a pressure fluid supply aggregate 37, 38 and a non-pressurized reservoir 24.

FIGS. 1 and 2 only show the components needed for explaining the construction and operation of the brake pressure regulator of the invention, while abstaining from illustrating an electronic regulator. The electronic regulator is intended to process the wheel sensor signals into switching signals for switching the electromagnetically operable valves 1, 2, 3, 4, 5, 6, 7, 8 and 47. Valves 2, 3, 4, 5, 6, 7 abd 47 are of a type which, in the de-energized condition of the actuating magnets, are open. It is common to refer to this type of valve as "normal open" or SO-valves.

Valves 1, 8 are closed if no electric current is applied to the actuating magnets. They are, therefore, designated as "normal closed valves" or SG-valves. Switching of all SO and SG-valves is carried out by output signals from the electronic regulator. Stored in the electronic regulator are one or more control algorithms which determine the switching of the electromagnetic valves. In this manner, the phases typical for anti-locking control, such as pressure decreasing phase, pressure stabilizing phase, pressure re-increasing phase, will be generated.

All parts of the system are illustrated in the brake releasing position.

The tandem master cylinder, generally, is designated by reference numeral 9. Substantially, it consists of a housing 10, a floating working piston 11 and a working piston 12 which, along with the booster piston 13 of the hydraulic booster, is in the form of a structural unit. Disposed in the tandem master cylinder are the pressure chambers 14 and 15. Equally disposed therein are so-called anchoring nuts 16, 17 associated with central valves 18, 19. The central valves are composed of a closure member 20, 21 and a valve seat 22, 23.

In the brake releasing position as shown, the valve closure members are held clear of the valve seats by the anchoring nuts 16, 17. Pressure fluid can thus be supplied from the reservoir 24 through the conduit 25, the annular chamber 26 and through the passageways 27, 28 to the pressure chamber 14 provided between the floating and working pistons 11, 12 and the cylinder bottom 29. Similarly, pressure fluid can flow from the reservoir 24 through conduit 30, the annular chamber 31 and the passageways 32, 33. Brake fluid can flow through the valve seat 23 of the central valve 19 into the pressure chamber 15 provided between floating piston 11 and working piston 12 shown to the right in FIG. 1. The pressure in chambers 14 and 15, and hence in the individual wheel brakes is the same as that pressure in the reservoir 24, hence all brakes are released.

To apply the brakes, depression of the brake pedal 65 acts, in a manner to be described in greater detail below, to drive working piston 12 to the left as viewed in FIG. 1. As piston 12 moves to the left, ball 21 of its central valve seats upon its seat 23, thus isolating pressure chamber 15 from the reservoir so that further movement of working piston 12 to the left will increase the pressure within chamber 15. This increased pressure in chamber 15 will in turn drive the floating piston 11 to the left, causing a seating of the ball 20 of the central valve of piston 11 to isolate chamber 14 from the reservoir so that further leftward movement of the floating piston 11 will increase the pressure in chamber 14.

The hydraulic brake force booster comprises an actuating piston 34 and the aforementioned booster piston 13 which, along with the working piston 12, forms a body. The booster comprises a pressure fluid inlet valve 35, also called a supply valve, and a pressure fluid outlet valve 36, also called a discharge valve.

A pressure fluid supply aggregate is provided for the hydraulic brake force booster, which aggregate comprises a pump 37 driven by a motor 38. The pump 37 conveys pressure fluid, via the check valve 39, through the pressure conduit 40 into the hydro-pneumatic accumulator 41 from which pressure fluid is passed through the conduit 42 into the annular chamber 43. An accumulator-loading valve, designated by reference numeral 44, and a pressure limiting valve, respectively, maintain a predetermined pressure level in the booster circuit.

In case of a pressure rise in the booster circuit beyond the pressure level defined through the pressure limiting valve 44, pressure fluid flows through the pressure limiting valve 44 and through the conduit 45 into the reservoir 24.

The SO-valve 4 is associated with the wheel cylinder of the brake of the front left-side wheel. This wheel cylinder is designated by the letters VL (left-side front). Similarly, the SO-valve 5 is associated with the right-side wheel cylinder HR of the rear wheel axle. The SO-valve 6 is associated with the wheel cylinder VR (right-side front) and the SO-valve 7 is associated with wheel cylinder HR (left-side rear). Now, the various modes of operation of the components of the brake pressure regulator will be described, viz. first in the normal brake mode.

BRAKE FORCE BOOSTER

Upon actuation of the brake pedal 65, an input force is initially generated as symbolized by arrow 66 and acts upon the piston rod 67. The piston rod 67 will displace the actuating piston 34 to the left as viewed in FIG. 1. This movement closes outlet valve 36 and opens the inlet valve 35. Individually, this means the following: the closure member 70 of the outlet valve 36 as a result of the movement of the actuating piston 34 to the left is seated on its valve seat to close passage 77. Due to the plunger means 68, the spherically shaped closure member 69 of the seated valve (inlet valve) 35 is removed from its valve seat against the force of the spring 74.

The pressure fluid contained in the annular chamber 43, in the radial channel 71 and in the axial channel 72, can now pass through the open inlet valve 35, into the booster pressure chamber 73. The booster piston 13, under the action of the pressure in the booster circuit (37, 40, 42), is moved to the left. This movement to the left will end once no intake is any longer effected through applying of the brake pedal 65. The actuating piston 34 and the plunger means 68 remain in the stand-still position. The inlet valve 35 closes once the booster piston 13 has moved to the left and once the closure member 69, under the pressure of spring 74, is sealingly seated on the valve seat. The running-on effect of the plunger means 68 is eliminated through the relative movement of the booster piston 13 to the left vis-a-vis the actuating piston 34.

The booster piston 13, hence, occupies a position determined by the position of the brake pedal 65. The booster force, therefore, is dependent on the applied pedal force. If the force applied to the brake pedal 65 is reduced or withdrawn altogether actuating piston 34 moves to the right, the outlet valve 36 opens and the inlet valve 35 closes, i.e., through the movement of the actuating piston 34 to the right. The valve seat of the outlet valve 36 disposed in the actuating piston 34 moves to the right while the closure member 70 of the outlet valve 36 remains in a stationary position as it is fixed to the plunger means 68 held by a stop on the booster piston 13. It is only after the booster piston 13 has been pushed back to the right in the tandem master cylinder 9, through the force of springs 75, 76, that the outlet valve 36, in turn, closes.

With the outlet valve opened, pressure fluid, through the channels 77, 78, the annular chamber 79, the channels 80, 81 and the conduit 82, can flow off into the non-pressurized reservoir 24.

Now, the normal brake mode as carried out by the tandem master cylinder 9, will be described. In the foregoing description of the operation of the hydraulic brake force booster, it has been shown that, upon actuation of the brake pedal 65, the booster piston 13 moves to the left. The working piston 12 and the booster piston 13 form a body. Once the working piston 12 is moved to the left, the pressure in the pressure chamber 15 increases as the central valve 19 closes. Pressure will develop in the conduits 83, 56. At the same time, the floating working piston 11 is moved to the left, with the closure member of the central valve 18, equally, being seated on the valve seat. Pressure develops in the pressure chamber 14, which pressure is passed on to the conduit 84, 48.

The brake system according to the present invention is a system having two brake actuating circuits disposed in diagonal relationship with respect to one another. The first circuit comprises conduits 83, 56 and wheel cylinders VR, HL, respectively. Connected to the first brake actuating circuit are SO-valves 6 and 7. As the two valves 6 and 7, in the normal brake mode, are in the open position, pressure from the pressure chamber 15 of the tandem master cylinder is applied to the wheel cylinders VR and HL through the conduits 83 and 56.

The second brake actuating circuit operates in analogous fashion. It is formed of conduits 84, 48 and wheel cylinders VL, HR, respectively. In case of a pressure buildup in the pressure chamber 14, pressure is applied to the wheel cylinders VL and HR through the aforedescribed conduit system and the open SO-valves 4, 5.

MODULATOR

The closure member 49, on the pedal side, is provided with a cylinder forming a guiding member 50 for the actuating piston 34. The actuating piston 34, on the pedal side, is provided with a piston shoulder 51 sealingly guided in the guiding member 50. The piston shoulder 51 forms an annular face 52 of effective cross-section when pressure is applied to the modulator chamber 53.

The modulator chamber 53 is formed by a alrge diameter bore section in guiding member 50, the effective annular face of the piston shoulders 51, and the tie-rod-type member 54 of the actuating piston 34 which extends in sliding sealed engagement through a small diameter continuation of the large diameter bore section in member 50. The modulator chamber 53, through conduit 55, is in communication with a normally closed passage valve 1 and two normally open blocking valves 2, 3.

The passage valve 1 and the two blocking valves 2, 3 are switchable by the output signals of the electronic regulator to control the pressure level in the modulator chamber 53. The regulator functions to maintain valves 1, 2 and 3 in their normal positions shown in FIGS. 1 and 2 for normal pedal controlled braking, and shifts valves 1, 2 and 3 to their off normal positions if, during braking, a skid condition at any wheel is detected. In brief, during normal brake pedal controlled braking, modulator chamber 53 is at reservoir pressure—i.e. valve 1 closed, valves 2 and 3 open to connect chamber 53 to reservoir—during anti skid control, modulator chamber 53 is connected via valve 1 to the high pressure side of pump 37, while valves 2 and 3 are closed.

A pressure decrease in the modulator chamber 53 is effected through the blocking valves which, in the open position, as shown in FIGS. 1 and 2, allow pressure fluid, through conduits 55, 61, 62, 64, 46, and 45, to flow off into the reservoir 24. The passage valve 1 is not switched during the pressure decreasing phase, i.e., it is closed. The aforedescribed blocking valves 4, 5, 6 and 7 are provided in the wheel cylinders for independent pressure modulation at the individual wheels under the control of the electronic regulator.

Once skid is determined on the wheels during the application of the brakes, the normal open valves 2, 3 are closed and the normal closed valve 1 is opened. The actuating piston 34, as a result of the increase in the hydraulic pressure in the modulator chamber 53 by the opening of valve 1 to connect chamber 53 to the high pressure line 40, is displaced to the right, the force developed by the increased pressure in chamber 53 overcoming the force applied to piston 34 by the brake pedal. The pressure fluid outlet valve 36 is opened so that fluid pressure flows off from booster chamber 73 via valve 36 into the non-pressurized reservoir 24. The pressure in the booster pressure chamber 73 is thus reduced. The booster piston 13 is displaced to the right. The pressure in the working chambers of the tandem master cylinder 9 and, hence, in the associated wheel cylinders, is reduced.

Once the control algorithm requires a rebuild-up of pressure in the wheel cylinders, the pressure in the modulator chamber 53 will be reduced. Individually, this means the following: valves 1, 2 and 3 will be restored the position as shown in FIGS. 1 and 2. The pressure fluid supply to modulator chamber 53 is interrupted by the closed valve 1. At the same time, pressure fluid can flow off from chamber 53, through the opened valves 2 and 3 into the reservoir 24.

As set forth in the foregoing, the pressure fluid supply valve 35, through the plunger means 68, is opened by the pedal force which, upon the release of pressure from modulator chamber 53, moves actuating piston 34 to the left. The pressure in the booster pressure chamber rises thereby causing the pressure in the pressure chambers of the tandem master cylinder 9 and in the wheel cylinders connected thereto to equally rise.

FIG. 2 shows the extension of the anti-locking control system as shown in FIG. 1 to a traction skid control system. In addition to the valves shown in FIG. 1, two additional electromagnetically switchable valves 8, 47 are shown in FIG. 2. Valve 47 is a blocking SO-valve, whereas valve 8 is a passage SG-valve. Moreover, a pressure limiting valve 63 is provided. The pressure limiting valve 63 serves to adapt the pressure in the system to the traction skid control, in particular, to decrease such pressure.

In the traction skid control, the non-pressurized reservoir 24, through the SO-valve 47, is blocked over the booster pressure chamber 73. The SG-valve 8 is switched to the open position so that pressure fluid can be passed from the pressure fluid supply aggregate, through the conduit 85, into the booster pressure chamber 73. The SG-valve 8 and the SO-valve 47 thus serve to actuate the booster piston 13 without requiring any actuation of brake pedal 65. The booster piston 13 moves the working piston of the tandem master cylinder 9 to the left, thereby developing pressure in the working chambers of tandem master cylinder 9. This pressure, through the hydraulic conduits, is passed on into the wheel cylinders to be decelerated of the actuated axle. The pressure in the wheel cylinders of the driven axle, hence, on the one hand, is controlled by the SO-valve 2, 3 and SG-valve 1, and, on the other hand, by those SO-valves that are associated with the wheel cylinders of the driven axle. The wheel cylinders of the non-driven axle are blocked by the SO-valves associated with such wheel cylinders.

While certain embodiments of the invention have been described in detail above in relation to a brake pressure regulator, it will be apparent to those skilled in the art that the disclosed embodiment may be modified. Therefore, the foregoing description is to be considered exemplary rather than limiting, and the true scope of the invention is that defined in the following claims.

What is claimed is:

1. In a brake pressure regulator for the hydraulic brake system of an automotive vehicle having a brake pedal and hydraulically actuated wheel brakes at each wheel of said vehicle, said system including wheel speed sensor means for sensing and generating signals representative of the respective speeds of rotation of individual wheel brakes in response to signals generated by said wheel sensor means, a master cylinder piston operable within a master cylinder chamber, in a master cylinder housing to apply braking pressure to said wheel brakes, and brake pedal actuated booster means for controlling said master cylinder piston, said booster means including a pressure supply source having a high supply conduit and a low pressure return conduit;

the improvement wherein said booster means comprises first means in said housing defining a booster chamber receiving one end of said master cylinder piston, said master cylinder piston being movable in a direction applying braking pressure to said wheel brakes in response to an increase in pressure in said booster chamber, second means in said housing defining a modulating chamber hydraulically isolated within said housing from said booster chamber, an actuating piston defining a movable wall of said modulating chamber and directly coupled to said brake pedal to move in one direction in response to a brake applying force exerted by said pedal and to move in the opposite direction when the force applied to said piston by pressure in said modulating chamber exceeds the force applied to said actuating piston by said pedal, first valve controlled passage means opening through said master cylinder piston into said booster chamber and including a normally closed first valve operable when opened to connect said booster chamber to said supply conduit, second valve controlled passage means opening through said actuating piston into said booster chamber and including a normally open second valve normally connecting said booster chamber to said return conduit and operable when closed to isolate said booster chamber from said return conduit, said actuating piston being movable relative to said master cylinder piston, actuating means responsive to movement of said actuating piston relative to master cylinder piston to actuate said first and said second valves to connect said booster chamber to said supply conduit in response to movement of said actuating piston in said one direction and to connect said booster chamber to said return conduit in response to movement of said actuating piston in said opposite direction, and third and fourth valve means operable by said control means for selectively connecting said modulating chamber to said supply conduit or to said return conduit in response to signals generated by said wheel sensor means.

2. The invention defined in claim 1 wherein said booster means further comprises a guide member having one end defining a fixed wall of said booster chamber opposed to said one end of said master cylinder piston and having a bore extending inwardly from the opposite end of said guide member terminating at a shoulder defining a fixed wall of said modulating chamber opposed to said actuating piston, said actuating piston being slidably received in said bore, said guide member having a counterbore extending therethrough from said shoulder to said one end, a rod member fixed to said actuating member in sliding sealed engagement in said counterbore adjacent said shoulder and said one end and defining an outlet chamber within said counterbore sealed from said booster chamber and said modulating chamber and in constant fluid communication with said return conduit, said second valve being located within said rod member between said booster chamber and said outlet chamber.

3. The invention defined in claim 2 further comprising fifth normally open control means operable valve means in said return conduit between said outlet chamber and said supply means, and sixth normally closed control means operable valve means in said supply conduit between said booster chamber and said supply means, said control means being operable to close said fifth valve means and to open said sixth valve means in response to signals from said wheel sensor means indicating slippage of a wheel of said vehicle.

4. The invention defined in claim 1 wherein said first passage means comprises a first flow passage in said master cylinder piston opening through said one end thereof into said booster chamber, a first valve seat defined in said first passage by a shoulder facing away from said booster chamber, and a first valve head spring biassed against the side of said first seat remote from said booster chamber, and said second passage means comprises a second flow passage extending into said rod member from said booster chamber to said outlet chamber via a second valve seat facing said booster chamber, a second valve head in said second flow passage between said second seat and said booster chamber, a plunger fixed at one end to said second valve head and having its opposite end projecting into said first passage and operable when said second head is engaged with said second seat to force said first valve head away from said first valve seat.

* * * * *